UNITED STATES PATENT OFFICE.

ADOLF D. KOHN AND LOUIS BECKHARDT, OF NEW YORK, N. Y., ASSIGNORS TO SAID LOUIS BECKHARDT.

METHOD OF REDUCING FIBROUS PLANTS.

SPECIFICATION forming part of Letters Patent No. 367,215, dated July 26, 1887.

Application filed October 23, 1886. Serial No. 217,027. (No specimens.)

*To all whom it may concern:*

Be it known that we, ADOLF D. KOHN and LOUIS BECKHARDT, of New York, in the county of New York and State of New York, have invented a new and useful Improvement in Methods of Reducing Fibrous Plants, and we do hereby declare that the following is a full, clear, and exact description of the same.

Our invention is an improved method of reducing fibrous-bearing plants of the kind hereinafter specified, for the purpose of obtaining from those plants fibers suitable for the manufacture of textile fabrics or paper, or any of the articles for which vegetable fibers are ordinarily used.

We apply the invention to the reduction of what are called "China grass" and to the following South American fiber-producing plants—namely, Caragnata, (*Bromelia spinesceus,*) tbira, (*Bromelia,*) ortiga brava, (*Urena baccifera,*) urana, (*Cordeline dracœnoides,*) samotin o'paino, (*Chorisia insignis,*) escobas, (*Nesaca salicifolia,*) and we also reduce by this process the French ramie and piedas; but the process is also applicable to other plants of the fibrous nature.

The general object of the invention is to produce a fiber capable of being substituted for silk, linen, or wool; but the special object is to produce a fiber which is flexible, fine, strong, and glossy.

In practically applying our invention we use a wooden vessel adapted to contain liquids, and in shape and dimensions suited to receive the longest plants without doubling or folding them upon themselves. In the bottom of this vessel we arrange a suitable steam-coil connected with any suitable steam-generator, this steam-heating apparatus being of the ordinary kind. Into this vessel or tank we place, say, one hundred gallons of pure water, and in this case the tank should be of such a size that it will be about two-thirds filled. In this water we mix one and one-quarter gallon of essence of lye. This solution is sufficient for two hundred pounds of the China grass or similar plants, which are placed therein. The plants are laid in straight and without entangling them, and over them we place bars or an open rack, by which they may be kept down under the solution, so as to be wholly immersed. Thus placed, the plants are boiled for about one hour, in which time the intercellular or gummy substances are wholly dissolved. We then wash the plants thoroughly in cold water until the dissolved gums and alkali solutions are wholly removed. We now place the material so treated in the same vessel or tank, or one of similar construction, and about two-thirds filled with water, with about ten pounds of castile-soap and about five pounds of glycerine added thereto. In this we place the plants in the same manner as above explained, and boil for about one and one-half hour, and after that wash the plants and dry them. As a third step in the process, we place the plants in the same manner in a tank containing fifty gallons of water with about fifteen gallons of glycerine, and allow them to remain one hour, after which the plants are washed clean, wrung out, and dried.

During the process of treating above described it is advantageous to stir or agitate the plants in the solution, but this should be done carefully, so as not to entangle the fibers.

We claim as our invention—

The hereinbefore-described process of treating fibrous plants, the same consisting in, first, boiling the plants in water mixed with essence of lye, then washing; secondly, in boiling the plants thus treated in water, soap, and glycerine, in substantially the proportions and for substantially the time described, then cleaning, and, thirdly, in soaking the plants thus treated in water and glycerine in substantially the proportions described, and, finally, washing and drying.

In testimony whereof we have signed our names to this specification in the presence of two subscribing witnesses.

ADOLF D. KOHN.
LOUIS BECKHARDT.

Witnesses:
WM. SINCLAIR,
I. SAMUEL.